(12) United States Patent
Gerlitz

(10) Patent No.: US 9,606,003 B2
(45) Date of Patent: Mar. 28, 2017

(54) CLINICAL HAND-HELD INFRARED THERMOMETER WITH SPECIAL OPTICAL CONFIGURATION

(76) Inventor: Yonatan Gerlitz, Lev Hasharon (IL)

( * ) Notice: Subject to any disclaimer, the term of this patent is extended or adjusted under 35 U.S.C. 154(b) by 1309 days.

(21) Appl. No.: 13/432,502

(22) Filed: Mar. 28, 2012

(65) Prior Publication Data

US 2013/0259087 A1     Oct. 3, 2013

(51) Int. Cl.
G01J 5/00 (2006.01)
G01J 5/02 (2006.01)
G01J 5/08 (2006.01)
G01J 5/06 (2006.01)

(52) U.S. Cl.
CPC ......... G01J 5/0265 (2013.01); G01J 5/0025 (2013.01); G01J 5/0275 (2013.01); G01J 5/0806 (2013.01); G01J 5/089 (2013.01); G01J 5/0834 (2013.01); G01J 2005/065 (2013.01)

(58) Field of Classification Search
CPC ........ G01J 5/0265; G01J 5/0834; G01J 5/089; G01J 5/0275; G01J 5/0025; G01J 5/0806; G01J 2005/065
See application file for complete search history.

(56) References Cited

U.S. PATENT DOCUMENTS

| | | | | |
|---|---|---|---|---|
| 696,604 | A * | 4/1902 | Leeds | B07B 7/08 209/710 |
| 2,813,203 | A * | 11/1957 | Machler | G01J 5/08 136/214 |
| 4,199,247 | A * | 4/1980 | Schwarz | G03B 9/07 396/509 |
| 4,797,840 | A * | 1/1989 | Fraden | G01J 5/0022 374/133 |
| 5,147,349 | A | 9/1992 | Johnson et al. | |
| 5,259,380 | A | 11/1993 | Mendes et al. | |
| 5,272,716 | A | 12/1993 | Soltz et al. | |
| 5,344,434 | A | 9/1994 | Talmore | |
| 5,464,436 | A | 11/1995 | Smith | |
| 5,663,828 | A | 9/1997 | Knowles et al. | |
| 6,013,096 | A | 1/2000 | Tucek | |

(Continued)

FOREIGN PATENT DOCUMENTS

EP 1 729 102 A3 7/2009
GB 696604 * 9/1953

*Primary Examiner* — Lisa Caputo
*Assistant Examiner* — Janice M Soto
(74) *Attorney, Agent, or Firm* — Rod D. Baker

(57) ABSTRACT

Method and apparatus for measuring temperature of a measured area of a surface without contacting the surface. The thermometer apparatus has an optical system which generates a correlative image of an infrared energy detector sensitive area at an image distance from the thermometer. A limiting aperture, having a size and a shape corresponding to those of the generated image, is between a mirror and the generated image. The measured area of the surface is between the generated image and the thermometer in use. With such a configuration, little infrared energy that does not originate from the measured area strikes the detector. Consequently, the energy reaching the detector is limited such that the size of the measured area remains constant, regardless of changes in the thermometer's field of view attributable to differences in the distance between the surface and the thermometer. A scan-and-integrate mode for practicing the invention is disclosed.

18 Claims, 7 Drawing Sheets

(56) References Cited

U.S. PATENT DOCUMENTS

| | | |
|---|---|---|
| 6,069,748 A | 5/2000 | Bietry |
| 6,108,138 A | 8/2000 | Ophey et al. |
| 6,267,779 B1 | 7/2001 | Gerdes |
| 6,306,160 B1 | 10/2001 | Nidetzky |
| 6,358,272 B1 | 3/2002 | Wilden |
| 6,612,719 B2 | 9/2003 | Richardson et al. |
| 6,746,473 B2 | 6/2004 | Shanks et al. |
| 7,118,563 B2 | 10/2006 | Weckwerth et al. |
| 7,374,569 B2 | 5/2008 | Whatcott et al. |
| 7,465,307 B2 | 12/2008 | Connors et al. |
| 7,479,137 B2 | 1/2009 | Yamazaki et al. |
| 7,524,328 B2 | 4/2009 | Connors et al. |
| 2002/0068926 A1 | 6/2002 | Ota et al. |
| 2002/0173833 A1 | 11/2002 | Korman et al. |
| 2003/0058916 A1 | 3/2003 | Tanaka et al. |
| 2003/0233138 A1 | 12/2003 | Spooner |
| 2004/0158301 A1 | 8/2004 | Tucek et al. |
| 2005/0131499 A1 | 6/2005 | Shanks et al. |
| 2006/0095099 A1 | 5/2006 | Shanks et al. |
| 2006/0129211 A1 | 6/2006 | Canitano et al. |
| 2006/0206173 A1 | 9/2006 | Gertner et al. |
| 2006/0206176 A1 | 9/2006 | Shanks et al. |
| 2006/0224218 A1 | 10/2006 | Tucek et al. |
| 2007/0121069 A1 | 5/2007 | Andersen et al. |
| 2007/0185552 A1 | 8/2007 | Masotti et al. |
| 2007/0198004 A1 | 8/2007 | Altshuler et al. |
| 2008/0027518 A1 | 1/2008 | Island et al. |
| 2008/0058783 A1 | 3/2008 | Altshuler et al. |
| 2008/0077198 A1 | 3/2008 | Webb et al. |
| 2008/0091179 A1 | 4/2008 | Durkin et al. |
| 2008/0091249 A1 | 4/2008 | Wang |
| 2008/0125835 A1 | 5/2008 | Laurent |
| 2008/0174464 A1* | 7/2008 | Robert ................. H03M 1/162 341/155 |
| 2008/0310166 A1 | 12/2008 | Chinniah et al. |
| 2009/0105791 A1 | 4/2009 | McGinnis et al. |
| 2010/0053070 A1 | 3/2010 | Tsai et al. |
| 2011/0228811 A1* | 9/2011 | Fraden ................. G01J 5/061 374/130 |

* cited by examiner

CLINICAL HAND-HELD INFRARED THERMOMETER WITH SPECIAL OPTICAL CONFIGURATION

BACKGROUND OF THE INVENTION

Field of the Invention

The present invention relates to thermometers, particularly to thermometers for taking the body temperature of a human patient, and specifically to a clinical thermometer with an optical configuration permitting the patient's temperature to be taken from different distances without contacting the patient with the thermometer.

Description of the Prior Art

There are a variety of known clinical infrared (IR) thermometers. However, most known IR thermometers require that the thermometer contact the patient's skin to take a temperature measurement. This requirement frequently compromises the thermometer's accuracy, because when the thermometer's reading tip touches the skin, the thermometer (if not pre-warmed) cools the skin at the measurement area. Additionally, the relatively warmer skin often heats the thermometer tip, causing further readings to be higher, (especially if the tip is in the field of view of the IR detector). Furthermore, because the thermometer touches the patient's skin, it is imperative that a hygienic protection be provided, such as placing a disposable hygienic cover over the tip or any other portion of the thermometer that may come into physical contact with the patient.

It is known to have a detector assembly with optics, for measuring radiation from an area, with no change of the measured area size and power measured within the predetermined distance limitation. Known devices, however, require a uniform emission (radiance) from across the measured area. This uniform radiance requirement substantially compromises the accurate utility of the device in most practical settings.

Against the foregoing background, the current invention was developed to address the identified problems.

SUMMARY OF THE INVENTION

There is disclosed hereby a clinical hand-held IR thermometer apparatus which incorporates an infrared detector and specially configured optics. The apparatus solves problems known in the art by providing a clinical hand-held IR thermometer which can measure a patient's body temperature from any range of distances between two pre-designed distance limits. The thermometer need not be placed in contact with the patient. Rather, the apparatus according to the invention accurately reads the radiated energy, from the same area size, at any distance from the patient within pre-designed range limitations.

The infrared detector of the present thermometer apparatus has a defined detector sensitive area which detects infrared radiation. The optics of the thermometer generates a correlative "image" of the detector's sensitive area at a pre-determined image distance from the thermometer. A limiting aperture, with a size and a shape approximately equal to the generated image's size and shape, is positioned between the apparatus optics and the generated image. Under paraxial assumption, any light ray arriving at the sensitive area of the detector is transmitted along a line which originates at the image; all the rays originating from the image pass through the limiting aperture and hit the sensitive area of the detector. With a limiting aperture so configured, no light ray that does not originate from the image can hit the sensitive surface of the detector.

Thus a cylindrical light beam (invisible to the naked eye), with a base area equal to the area of the limiting aperture, is created between the limiting aperture and the generated image. If the surface emission is uniform the detected reading's area size and energy level will be always the same, regardless of the location of the surface (patient's skin) between the aperture and the image. Within known distance limits, therefore, the temperature measurement of the patient's skin is independent of the distance of the thermometer from the skin's surface. This permits an IR thermometer that is much easier to use, as the user need not take extra care to aim and stabilize the apparatus at some fixed distance from the patient. The temperature measurement's repeatability, when varying the distance between the measured surface and the detector, depends only on the optics, or the image quality, or the optics aberrations.

However, it may be the case that surface emission, that is, the energy radiance, from the measured area is not uniform, but varies sufficiently to impact the accuracy of the apparatus. Accordingly, in a preferred embodiment there is provided in the apparatus a means for performing a "scan and integrate" function for evaluating the radiance. Circuitry and logic is provided for scanning points inside the measured area, and integrating the readings over a predetermined short period of time.

The suggested structure of the presently disclosed clinical IR thermometer is advantageous because the thermometer can be held by hand, but nevertheless can perform measurements at any practical distance between the thermometer and the pre-designed image distance, with good repeatability and measurement of the same spot size. No hygienic cover is required, and the thermometer tip is unaffected by warming or cooling effects resulting from a touching of the skin.

An advantageous aspect of a preferred embodiment of the disclosed thermometer apparatus is a design of a shutter, similar to a camera shutter, which protects the apparatus's detector and optics from foreign particulates, particularly dirt and dust, which can degrade measurement accuracy over time.

Yet another feature of the disclosed apparatus is the addition of a visible light source, such as a LED, which indicates and illuminates the "target" area whose measurement is to be taken. This feature is highly advantageous in the performance of a "no-touch" measurement.

Also disclosed are methods and apparatus components to facilitate a scan-and-integrate mode for practicing the invention to obtain improved temperature readings from surfaces having non-uniform emissions of infrared energy.

The suggested design has yet another advantage: while the field of view is changing according to the distance of the measured surface from the thermometer, the measured area remains always the same.

BRIEF DESCRIPTION OF THE DRAWINGS

The accompanying drawings, which are incorporated into and form a part of the specification, illustrate several embodiments of the present invention and, together with the written description, serve to explain the principles of the invention. The drawings are only for the purpose of illustrating a preferred embodiment of the invention and are not to be construed as limiting the invention. In the drawings.

The same label numerals are used to identify the same or similar items throughout the various views.

DETAILED DESCRIPTION OF A PREFERRED EMBODIMENT

Best Mode for Practicing the Invention

There is disclosed hereby a clinical hand-held IR thermometer that includes special optics which enable it to "look" at a target measured surface (e.g., on a human patient) from different distances and yet obtain accurate temperature readings. Thus, a temperature measurement can be taken without contacting the thermometer with the surface of the patient's skin, and the distance between the thermometer and the measured surface of interest is not critical (within a reasonable, and practical, ranges). It is contemplated that the apparatus finds primary beneficial use in human medical diagnostic and treatment settings, but its use is not so limited. The apparatus may also find application in veterinary, scientific laboratory, or industrial fields as well. Uniform IR emission can be assumed in many circumstances; nevertheless, the present invention includes a "scan-and-integrate" means and mode for accounting for non-uniform IR radiance from a surface of interest. Thus, the temperature of a target area on the surface of a patient's skin can be reasonably accurately measured with the disclosed apparatus without careful regard for the distance from which the measurement is taken.

Figure 1:
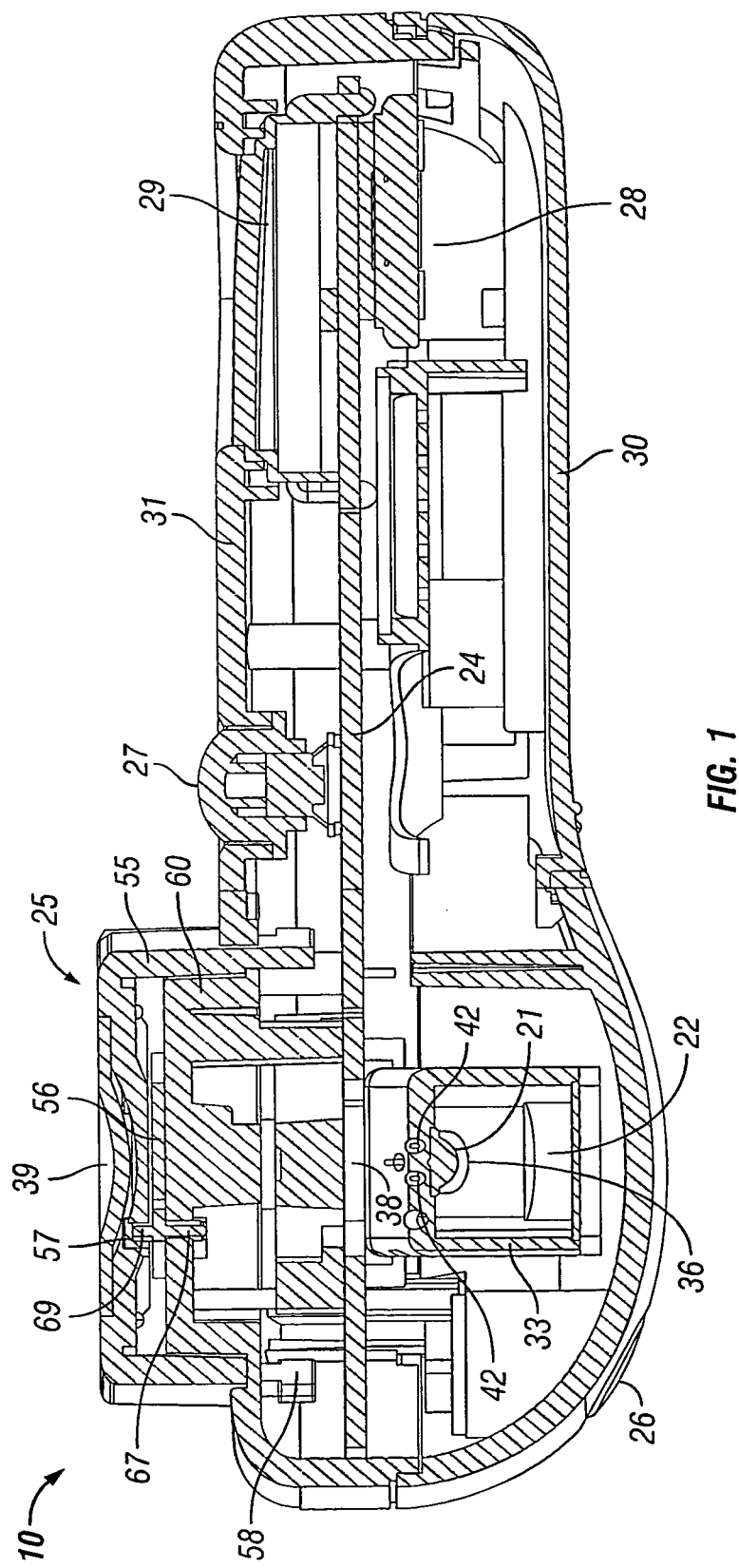
FIG. 1 is a longitudinal cross section of a preferred embodiment of a clinical hand-held IR thermometer apparatus according to the present disclosure.
Figure 3:
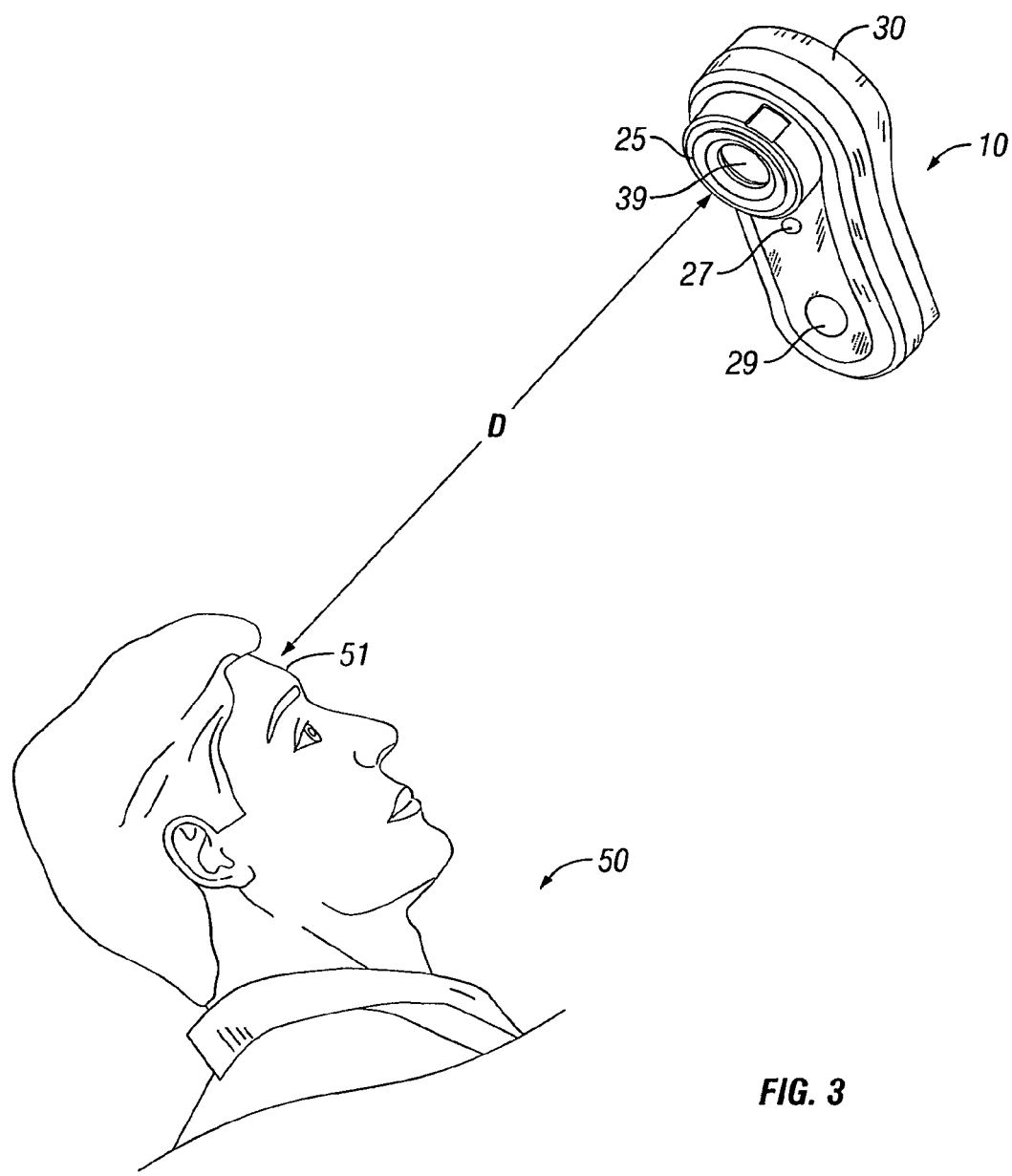
FIG. 3 is a diagrammatic perspective view of an embodiment of the presently disclosed apparatus, showing its position for use in relation to a patient.
Figures 5, 5A:
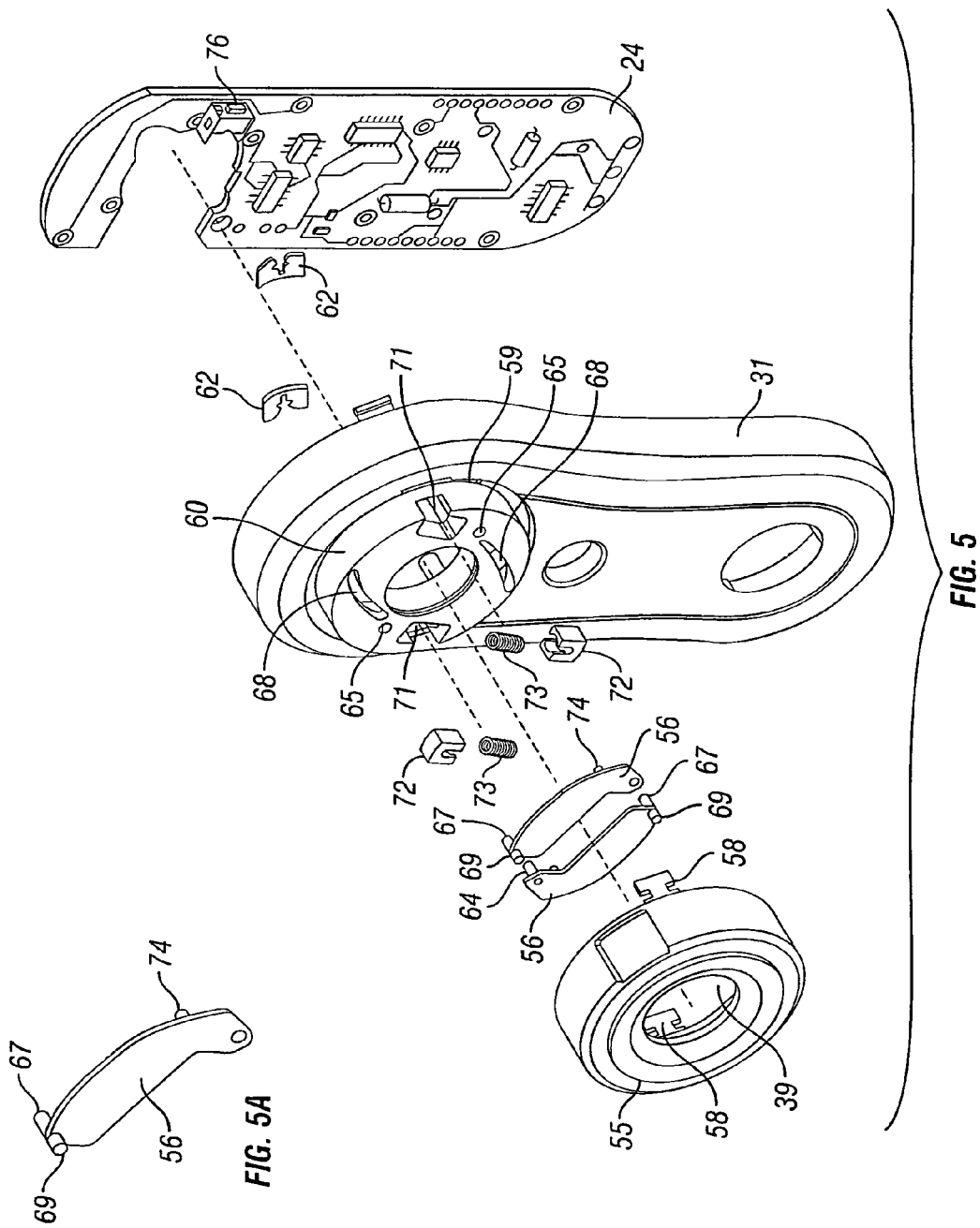
FIG. 5 is an exploded perspective view of selected components of an apparatus according to the present disclosure, illustrating a protective shutter mechanism for the apparatus in accordance with a preferred embodiment.
FIG. 5A is an enlarged perspective view of a shutter leaf seen in FIG. 5.

Attention is invited to the axial cross section provided in FIG. 1, illustrating generally an embodiment of a clinical hand-held IR thermometer apparatus 10 according to the present invention. The thermometer 10 has an oblong, hollow, main housing 30 fabricated from a suitably durable and stiff material, preferably a lightweight metal alloy or a molded plastic or the like. The housing 30 is shaped and sized to be held comfortably in one hand. As suggested by FIG. 5, the main housing 30 may be molded in two complementary halves (only front half 31 seen in FIG. 5), which are then secured together. Having combined reference to FIGS. 1 and 5, it is seen that on the front of the main housing 30 there is provided a shutter assembly 25. The shutter assembly 25 defines an apparatus main aperture 39. Infrared energy emitted from a surface of interest (e.g., the patient's skin), whose temperature is to be measured, enters the thermometer apparatus 10 via the main aperture 39. The main aperture 39 preferably is circular as seen in FIGS. 3 and 5; the configuration and function of the shutter assembly 25 will be described further hereafter.

The hollow main housing 30 contains an IR detector 21 and functionally related optical components, and mounts other operative electronic components, which permit the advantageous "no-touch" measurement of temperature to be described further herein. The thermometer 10 preferably is powered by a lithium battery 28 removable and replaceable within the housing 30.

Figure 2:
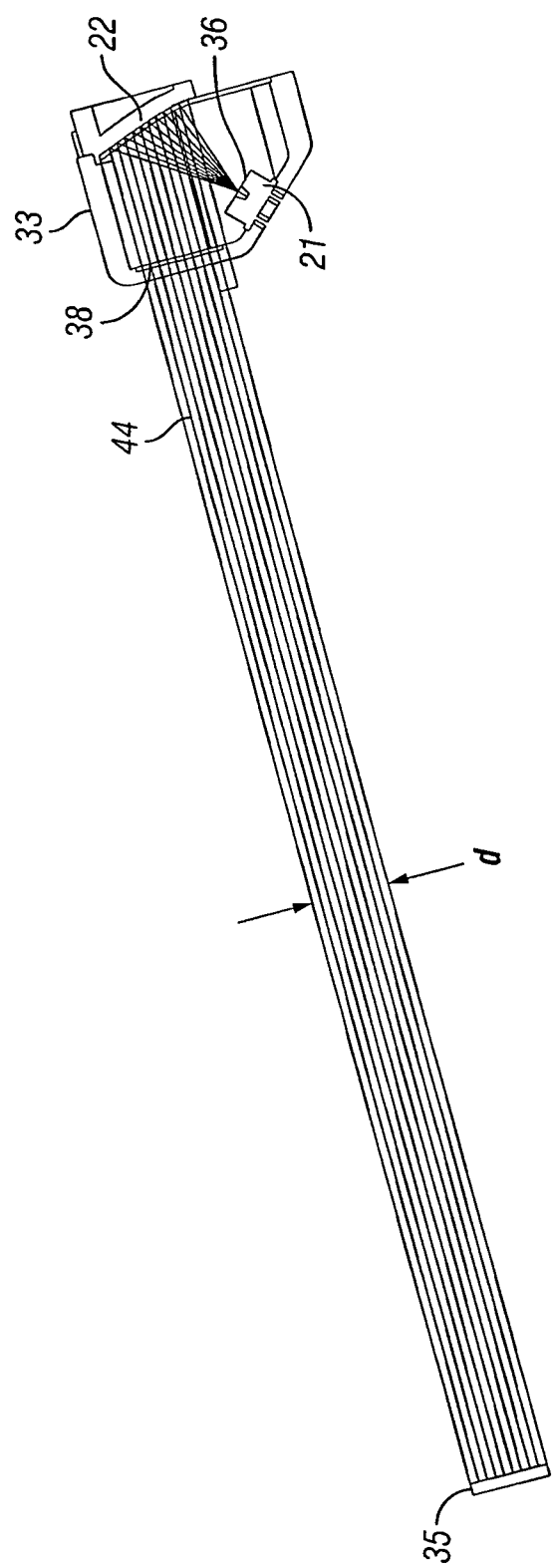
FIG. 2 is the schematic optical diagram illustrating the arrangement of the apparatus detector, optics and limiting aperture in relation to each other and to a generated optical image, according to a preferred embodiment of the presently disclosed apparatus; for simplicity of illustration, most of the apparatus components seen in FIG. 1 are not depicted in FIG. 2.

Referring also to FIG. 2, clinical hand-held IR thermometer 10 features an optical system including the IR detector 21 that faces, in confronting relation, a parabolic mirror 22. The mirror 22 functions to create, in effect, an imaginary duplicate "image" of the detector's sensitive surface 36 in a plane at a pre-determinable image distance from the thermometer 10, as described further hereafter. On the front of the main housing 30, opposite the mirror 22, is disposed the shutter assembly 25 which can be operated (manually, or by switched power) by the user to move the shutter assembly between an open condition and a closed condition. When in a closed condition, the shutter assembly 25 protects the detector 21 and other optics and interior components from dust, dirt, and other particulate contaminates. Only when the shutter assembly 25 is moved into the open condition is IR light energy admitted into the thermometer interior.

The thermometer electronics are assembled on a printed circuit board (PCB) 24. The PCB 24 is generally according to known design, configuration and function, and includes ROM and/or RAM modules that may be integrated and programmed according to principles available in the computer programming arts. The circuitry and firmware configuration for the PCB 24 is within known design arts, and may be accomplished by one skilled in the circuit and firmware arts having reference to the present disclosure. Thermometer electronics also may include circuitry such as that seen in FIG. 6, which provides for a "scan and integrate" feature for improving the accuracy of the apparatus readings.

The main housing 30 mounts, at an ergonomically appropriate location, a main actuation button 26. The main actuation button 26, used to turn the entire apparatus 10 on and off, is in signal communication with the PCB circuitry, and is of any type suitable for actuating the thermometer into a powered-on condition ready for use. The main actuation button 26 may be used to turn the power off when a measurement has been satisfactorily taken, and the thermometer is no longer in use. There preferably also is provided on the housing 30 a function button 27, also is in communication with the PCB 24 circuitry. The function button 27 is selectively manipulated by the user to initiate the sensor reading, that is, to actually "take" the temperature measurement. Either of the buttons 26, 27, or a third button (not shown) may also have a function to activate and regulate the thermometer's memory function, as well as to controllably change the temperature measurement units between degrees Celsius and degrees Fahrenheit, as desired. An LCD display 29 viewable on (or through) the exterior of the housing 30 displays a visual readout of the measurement result, status indications, and any warnings, and error signals generated by the PCB electronics.

FIG. 2 depicts schematically, in isolation, the positional relationships of the detector and optical system according to a preferred embodiment. Detector 21 preferably is a thermopile detector, such as (for example only) thermopile detector Model No. TPS-333 available from Perkin Elmer corporation of Waltham, Mass., USA. The detector 21 is securely mounted in detector housing 33, which is disposed within the main housing 30 (FIG. 1). The detector housing 33 preferably is fabricated from a lightweight metal such as aluminum, so to serve doubly as a heat sink. The detector housing 33 preferably is coated, especially on its interior surfaces, with a black coating to absorb stray light. Also mounted interior to the detector housing 33 is the mirror 22. Mirror 22 in a preferred embodiment is a 45° off-axis parabolic mirror, and is in optical confrontation with the detector 21. The parabolic mirror 22 and the detector 21 are so arranged within the main housing 30 such that the sensitive surface 36 of the detector is positioned further from the focal point of the mirror 22, in order to create a real image 35 of the sensitive surface at a pre-designated image distance. Accordingly, in optical reverse, the mirror 22 creates a planar optical image 35 of the detector's sensitive surface 36 at a certain distance from the mirror, as illustrated by FIG. 2. This image distance can be pre-selected and predetermined, according to the design use of the apparatus, by applying known formulae and principles from optical physics. Among the factors to be considered in determining the distance between the mirror 22 and the optical image 35 are the optical characteristics (including definition of the parabolic reflective surface) of the mirror 22 and the distance between the mirror and the detector 21.

Continuing reference is made to FIGS. 1 and 2. The detector housing 33 has an axially symmetric limiting aperture 38 defined in a side thereof. The limiting aperture 38 is coaxially aligned with the apparatus main aperture 39. The apparatus main aperture 39, being at the exterior surface of the apparatus 10, is situated optically between the limiting aperture 38 in the detector housing 33 and the location of the image 35. Thus the apertures 38, 39 are concentric with the apparatus's optical axis. The limiting aperture 38 is defined substantially to correspond in size and shape to the size and shape of the generated optical image 35. Thus, as seen in FIG. 2, both the optical image 35 and the limiting aperture 38 have an approximately common (equal) lateral or radial dimension d.

The distance between the mirror 22 and the limiting aperture 38 is fixed in the preferred embodiment of FIG. 2, and the distance between the liming aperture 38 and the main aperture 39 (FIG. 1) also does not vary during operation. When the thermometer 10 is in use, the distance from the main aperture 39 to the optical image 35 therefore is calculable.

Paraxial assumptions are made in the science of paraxial optics. Paraxial optics involves ray-tracing techniques performed within limits of very small ray angles and heights. This branch of optics permits several assumptions that simplify the arithmetic and geometry of ray-tracing. Some of these assumptions are summarized.

One assumption is to Snell's Law itself. When refracting from one material into another, the well-known equation is $$n \sin \theta = n' \sin \theta'$$

where unprimed quantities are before refraction and primed quantities are after refraction. For small angles $\sin \theta \approx \theta$ so Snell's Law can be written $$n\theta = n'\theta'$$

Many fundamentals in optics are based upon this assumption of linearity, from which the term "first-order optics" is derived. Aberrations are third-order and higher deviations from this linearity. The paraxial properties of optical systems are often considered to be the properties the system exhibits in the absence of aberrations.

Another assumption is that, as the ray height on a surface is small, the curvature of surfaces can be ignored, allowing rays to be traced between flat surfaces of equivalent power. The power of a surface of curvature C between two indices n and n' is:

$$\phi = (n' - n) \cdot C$$

By ignoring the curvature for ray-intercept purposes, the need to computing the exact ray-surface intercept point can be omitted.

Finally, it may be assumed that the tangent of a ray angle (the ray slope) may be replaced by the ray angle itself. This assumption, which may not be intuitively obvious, nevertheless may be important. A paraxial ray being traced between two flat surfaces has an initial height y on the first surface and has y- and z-direction cosines {m, n}. Its height y' on the next surface is given by:

$$\begin{aligned} y' &= y + \tan\theta \cdot t \\ &= y + (m/n) \cdot t \\ &\approx y + \theta \cdot t \end{aligned}$$

because not only does $\sin \theta \approx \theta$, but $\tan \theta \approx \theta$ also. This has a fundamental consequence which is sometimes overlooked: the slope of a paraxial ray is the same as its angle.

The foregoing assumptions, among others, known from paraxial optics thus simplify the determination of ray tracing, including ray-tracing techniques useable to determine configurations for the disclosed apparatus.

Under paraxial assumption, and as seen in FIG. 2, light rays 44 (including IR) arriving at the sensitive surface 36 of the detector 21 trace along a line "originating" from the image 35, and all the rays 44 which originate at the image (and which pass through the limiting aperture 38), must strike the light-sensitive surface 36 of the detector. By the specialized screening provided by the limiting aperture 38, no ray that does not originate at the image 35 can impinge the sensitive surface 36 of the detector 21.

It is seen therefore in FIG. 2 that the apparatus optical system creates a cylindrical or columnar light beam, defined collectively by the rays 44, between the limiting aperture 38 and the image 35. The cylindrical beam has a base area equal to the area of the limiting aperture 38; this area will always be the same, or very nearly the same, as the area of the image 35 itself, and thus the beam also has a lateral extent of dimension d. Consequently, the size of the image 35, and the correlated energy level of the beam impinging the detector 21, is always the same, regardless of the distance between the image 35 and the limiting aperture 38 (especially when the surface emission is uniform).

The optical system of the preferred embedment illustrated in FIG. 2 is reflective, using a parabolic mirror 22. It is to be understood that alternative optical systems, including refractive optical lenses and/or other reflective mirror configurations, may be used to generate the optical image 35. Such alternative and functionally equivalent embodiments of the optical system may be configured according to known principles of optics physics without departing from the scope of the present invention.

FIG. 3 illustrates a resulting practical advantage of the presently disclosed apparatus and method. The thermometer 10 is used to take the bodily temperature of a surface of interest, such as the skin of a patient 50. The patient 50 has a targeted measured area 51 at some location on his body, such as the skin of the forehead as seen in FIG. 3, or the skin surface at any other appropriate and available location. The measured area 51 is at the surface whose temperature is to be measured by the thermometer 10. The measured area 51 thus is on the targeted surface of interest.

When the apparatus 10 is in use to take a temperature reading, the thermometer is held at some distance D from the measured area 51, with the main aperture 39 aimed at the measured area 51; distance D is between the main aperture 39 and the measured area 51. The measurement distance D between the main aperture 39 and the measured area 51 is less than or equal to the distance, measured along the same line, between the main aperture 39 and the optical image 35 (FIG. 2). Thus, when the thermometer apparatus 10 is in use, the optical image 35 is positioned at or behind the measured area 51; when the apparatus is correctly positioned to take a temperature reading of the measured area 51, the measured area 51 is situated between the optical image 35 and the main aperture 39. However, because the measured area 51 will be within the columnar beam defined by and between the image 35 and the limiting aperture 38, the particular measurement distance between the main aperture 39 and the measured area 51 at the time of measurement is not critical. Rather, the measurement distance D can be within a range of distances without affecting the accuracy or repeatability of the temperature measurement.

In the practice of the invention the thermometer 10 is held by the user at a measurement distance D from the patient's target measured area 51. This distance is the linear distance measured from the main aperture 39 (as defined by the apparatus' shutter assembly 25) to the measured area 51 on the patent. Measurement distance D is directly related to (and slightly less than) the distance between the limiting aperture 38 and the measured area 51. Accordingly, when the apparatus is actuated to take a measurement, the imaginary column seen in FIG. 2 extends between the image 35 at or behind the patient's measured area 51 and the main aperture 39. The IR rays 44 pass through the main aperture 39 and the limiting aperture 38. As explained above, the effect of the limiting aperture 38 is that no IR light ray that does not originate from the image 35 can hit the sensitive surface of the detector 21. The "imaginary" cylindrical beam of IR light energy, with a base area equal to the area of the limiting aperture 38, is created between the limiting aperture and the image 35 on the skin surface of the patient.

The size of the measured area 51 thus is substantially equal to the size of the image 35. These respective sizes always substantially correspond, because the detector 21 only receives light rays 44 that are on linear lines "originating" from the image 35, as the system has aperture 38 the size of the image. Performance of a ray tracing for the system demonstrates that all the rays 44 are within the beam defined by the image 35 and the aperture 38. The length of this column is the distance between the aperture and the image. Any measured area 51 placed between the limiting aperture and the image 35 has the same size cross-sectional area as the column of rays. As a result, only the light rays (e.g. IR radiation) emanating from a measured area 51 of constant size arrive at the detector's sensitive surface 36. Within the gross parameters of the optical system, the sectional size of the surface (patient's skin) is limited to the cross-sectional size and shape of the optical column of rays 44 without regard for the distance from the surface to the thermometer 10. Thus, the infrared energy flux (represented generally by the rays 44 in FIG. 2) from the measured area 51 and measured by the detector 21 is unchanged by variances in the field of view due to changes in the measurement distance.

The temperature measurement's repeatability, when varying the distance between the measured surface of interest and the detector 21 depends only on the optics, or the image quality, or the optics aberrations. The indicated design thus has a unique advantage: while technically the apparatus field of view changes according to the distance of the measured surface from the thermometer, the area of the measured surface is always the same. The field of view of the system is the maximum optical angle that the apparatus system can "see," that is, from which it can receive incoming IR radiation. The field of view changes according to target distance, but the optics of the present disclosure hold constant the size of the measured area from which temperature is detected.

Figure 4:
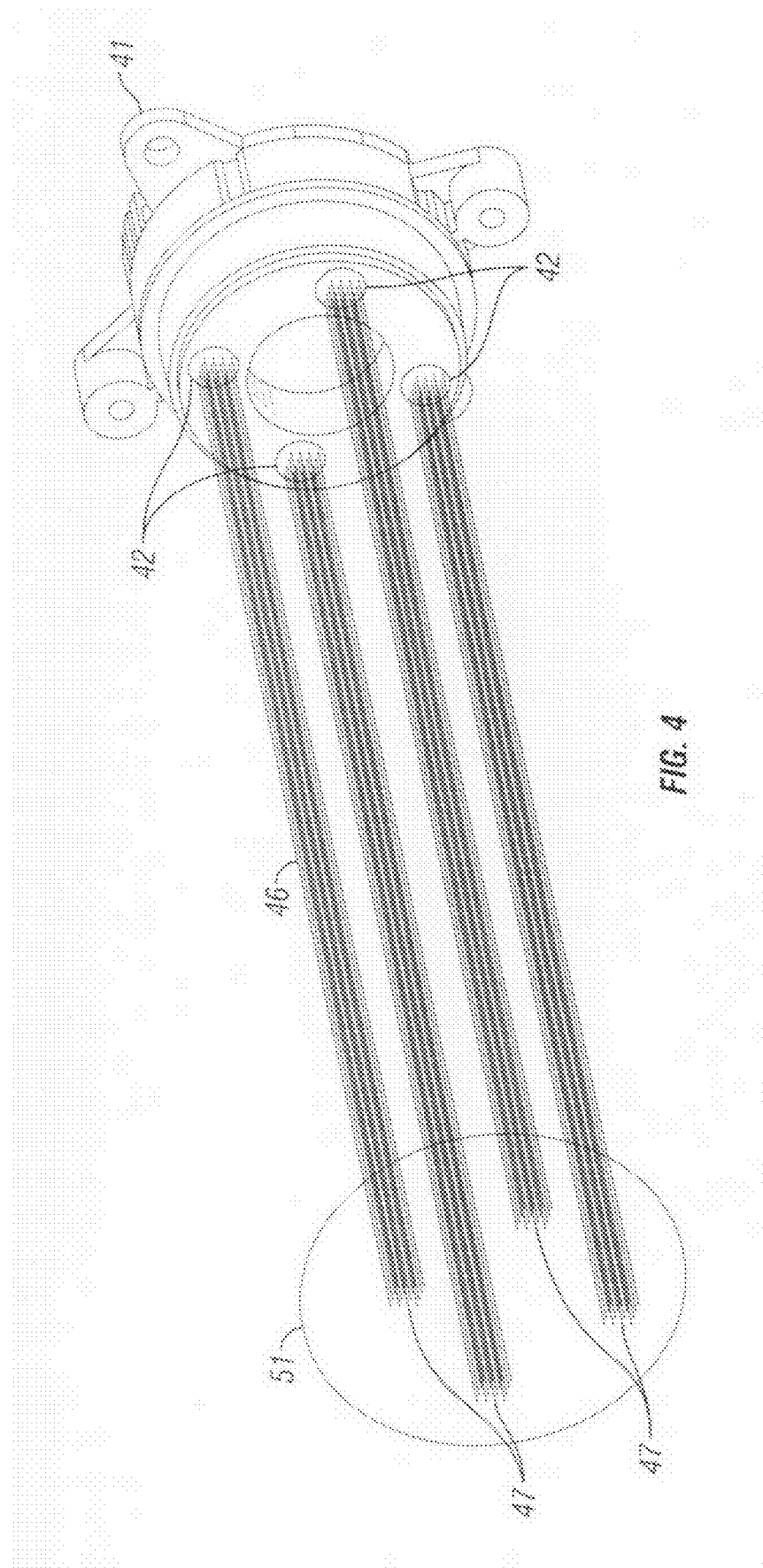
FIG. 4 is a schematic perspective view of an LED assembly portion of an apparatus according to the present disclosure, showing its illumination of the target surface of the measured area in accordance with the present disclosure.

In a preferred but optional embodiment of the thermometer apparatus 10, the aiming of the apparatus during use is facilitated by the provision of a plurality of light-emitting diodes (LED). Reference is made to FIG. 4. There is a LED assembly 41 which includes a plurality, preferably at least three and most preferably four (as seen in FIG. 4) LEDs 42. LEDs 42 generate visible light, and are powered by lithium battery 28 and are controllably activated with the main actuation button 26 (preferred) or alternatively the function button 27. The assembly 41 mounting the LEDs 42 may be situated exteriorly upon the main housing 30, such as being integrated with the shutter assembly 25, or more preferably is disposed interiorly within the main housing. For example, FIG. 1 illustrates that the assembly 41 may be integral with, or associated with, the detector housing 33. As depicted in FIG. 1, the LEDs 42 are positioned so that the visible light beams generated thereby are directed out of the housing 30 and exit via the main aperture 39 when the shutter assembly 25 is in the open position.

Specific attention is returned to FIG. 4. The LEDs 42 have lenses whereby the LEDs create approximately parallel light beams 46. The beams 46 are generally parallel and proximate to the invisible rays 44 of IR light (FIG. 2) being detected by the detector 21. When actuated, the LED beams 46 illuminate the surface of the measured area 51. The beams 46 thus allow the user to quickly and safely aim the thermometer 10 at a suitable and appropriate measured area 51 on the patient 50 (FIG. 3). The LED beams 46 generate spots 47 of visible light on the patient's skin at the general location of the measured area 51, which is within the imaginary column extending between and defined by the base image 35 and the limiting aperture 38. When the spotlights 47 are seen by the user to appear at the desired location upon the patient (or other surface of interest), the detector 21 can be activated to take the temperature measurement with confidence that the temperature of an appropriate portion of the patient's body surface is being measured.

Thus the IR heat energy originates from the target measured area 51, and the measured area is between the optical image 35 and the thermometer 10 when a measurement is taken. The image 35 is generated at a certain fixed distance from the thermometer; to take a temperature reading, the measured surface (patient's skin) 51 is located at a distance D (FIG. 3) from the thermometer that is equal to or less than the distance from the thermometer to the optical image (as suggested in FIG. 2). The distance D from the measured surface 51 to the thermometer 10 is not critical and is within a reasonable range of distances.

The effective range of distances, from the measured surface, at which the thermometer can take a useable reading, is controlled by optical factors, including the aperture size and focal length of the optics. Optical aperture and focal length dictate the distance from the aperture at which the image 35 is generated. The effective range accordingly can be calculated, and thus predetermined, for a particular embodiment of the apparatus according to known optical principles and formulae.

Reference is made more specifically to FIG. 5, showing the components of the shutter assembly 25 in accordance with a possible preferred embodiment. The primary purpose and function of the shutter assembly 25 is to protect the optical system and other apparatus components interior to the main housing 30 when the thermometer 10 is not in use to take a temperature measurement. The assembly 25 is controllably operable to open and close the main aperture 39; when the shutter assembly is in the closed condition, the main aperture 39 is shut closed to prevent entry of ambient light energy, and debris, into the interior of the housing 30. Shutter leaves 56 are controllably movable so to open or close access through the main aperture 39.

The shutter assembly 25 includes an annular rotatable shutter ring 55 operable to move the pair of shutter leaves 56 between open and closed positions. When the shutter leaves 56 are in the closed position, they occlude and protectively close the main aperture 39; when they are moved to the open position, IR light rays 44 are able to pass through the main aperture 39, via the central opening in the annular shutter ring 55, and on to the mirror 22 and detector 21 via the limiting aperture 38. Thus, the apparatus is able to take a temperature reading only when the shutter assembly 25 is moved to an open position; otherwise, the main aperture 39 is closed to protect the interior components of the thermometer 10.

As seen in FIG. 5, shutter ring 55 is rotatably mounted upon the main housing 30. The shutter ring 55 is configured generally as a hollow cylinder, and is rotatably mounted upon and around the cylindrical mounting bezel 60 that is provided on, preferably integrally with, the front half 31 of the main housing. The inside diameter of the shutter ring 55 is just slightly greater than the outside diameter of the mounting bezel 60, so that the ring 55 can slidably pivot concentrically upon and around the bezel 60 upon which it is situated. The mounting bezel 60 is fully penetrated by a central opening that registers with, and corresponds in size and shape, to the main aperture 39 of the apparatus. Also seen in FIG. 5 is the pair of leaf guide slots 68. The leaf guide slots 68 are defined through diametrically opposite sides of the face of the mounting bezel 60. Each leaf guide slot 68 is approximately in the shape of an arc, but has an inner end that terminates closer to the center of the bezel 60 and an outer end that terminates relatively farther from the bezel's center. Thus, each leaf guide slot 68 is a narrow slot that spirals mildly outward from the center of the face of the bezel 60. These gently spiraling arc shapes of the leaf guide slots 68 are what direct the sliding pivoting movements of the shutter leaves 56 between open and closed positions.

The mounting bezel 60 also has defined, at diametrically opposite locations on the perimeter of its face, a pair of spring sockets 71. Each spring sockets 71 receives and holds an associated cubic, notched, spring locker 72. Each spring locker 72 in turn receives and holds therein a helical compression spring 73. The springs 73 resist movement of the shutter leaves 56, and the lockers 72 serve to lock the leaves at maximum extent of travel.

The shutter ring 55 has at least two mounting tabs 58 that are slidably disposed through a corresponding number (e.g., two) of arcuate (i.e., partial segments of a circle) tab slots 59 defined through the housing front half 31 adjacent to, and on diametrically opposite sides of, the shutter mounting bezel 60. When the shutter ring 55 is fully and properly installed upon the main housing, its mounting tabs 58 extend completely through corresponding ones of the arcuate tab slots 59. A tab clip 62 is provided for each mounting tab 58; the clips are sized larger than the width of the tab slots 59. With the tabs 58 disposed through corresponding ones of the tab slots 59, a clip 62 is engaged upon and around the distal end of each mounting tab to prevent its withdrawal back through the corresponding tab slot 59. By these means, the shutter ring 55 is maintained in place upon the front half 31 of the main housing, but can rotate back and forth through approximately 90 degrees to move the shutter leaves 56. The two shutter leaves 56 are moved by the rotating shutter ring 55.

A description of either one shutter leaf 56 serves to describe both leaves. A single shutter leaf 56 is seen the enlarged view of FIG. 5A. Referring to FIGS. 5 and 5A, it is seen that each shutter leaf 56 is provided with four projecting pins that function to attach the leaf to the mounting bezel 60 and to regulate the movement of the leaf in relation to the shutter ring 55 and bezel 60. On each shutter leaf 56 there is a pivot pin 64 that extends from the back side of the leaf and which is inserted into a corresponding pivot hole 65 in the face of the bezel 60. The pivot pin 64 is inserted into, but can rotate within, its pivot hole 65. At the opposite end of the leaf 56 from the pivot pin is a sliding pin 67 which also extends from the back side of the leaf. The sliding pin 67 projects into a corresponding one of the leaf guide slots 68. Because each leaf guide slot 68 spirals outward from the center of the bezel 60, as a leaf's sliding pin slides along within an associated slot 68, and its pivot pin 64 pivots within its pivot hole 65, the leaf 56 shifts toward or away from the center of the bezel.

Projecting from the front side of each shutter leaf 56, on the opposite side of the leaf from the sliding pin 67, is a linking pin 69. The linking pin 69 on each shutter leaf is inserted into, and rotatable within, a corresponding notch 57 (see also FIG. 1) in the back side of the shutter ring 55. Consequently, as the shutter ring 55 is rotated, the pivotal connection between the shutter ring and the swinging end of the shutter leaf 56 causes the leaf to pivot on its pivot pin 64 and about the pivot hole 65. This swinging action of the leaf 56, guided by the sliding movement of the sliding pin 67 along the mildly spiraled track defined by the correlated leaf guide slot 68, impels the movement of the shutter leaf. The travel of each shutter leaf 56 is limited by the contact of the sliding pin 67 with either terminus of its associated leaf guide slot. At one end of the leaf shutter's movement, when the leaf 56 is in the open position, its sliding pin 67 is situated at or near the radially outer end of its leaf guide slot 68; similarly, when the leaf 56 is in the closed position, its sliding pin 67 is situated at or near the radially inner end of its leaf guide slot 68.

Each shutter leaf 56 also features a small lock pin 74 which projects from its back side. The lock pin 74 is located and sized to be releasably engageable into a notch of a respective spring locker 72 when the leaf 56 has been shifted to the full extent of its swinging travel to the fully open position. Springs 73 and spring lockers 72 create some resistance to the swinging movement of the shutter leaves 56, as the swinging movement of the leaves from a closed position toward an open position is against the compressive force of the springs.

Notably, a mounting tab 58 preferably extends rearward a sufficient extent to be contactable with an activator switch 76. Activator switch 76 is in communication with the apparatus circuitry, such that the thermometer 10 can be actuated and a temperature reading taken only when the activator switch is engaged. When the shutter ring 55 is rotated to move the leaves 56 into the fully open position, the mounting tab 58 pushes against, and actuates, the activator switch 76 to permit the apparatus circuitry to be turned on to operate the thermometer 10 at this position.

Thus, when the apparatus 10 is in proper position to take a temperature reading, the user manually rotates the shutter ring 55 around the mounting bezel 60 (e.g., clockwise in FIG. 5). (In alternative sophisticated embodiments, the rotation of the shutter ring may be by small motorized power.) The rotation of the shutter ring 55 imparts a pivotal movement to both shutter leaves 56, due to the rotating engagement between the swinging ends of the leaves 56 and the rotating ring 55 provided by the respective linking pins 69. The leaves 56 thus pivot about their respective pivot pins 64, as the pivot pins rotate in the pivot holes 65. The movement of the swinging ends of the leaves is guided by the sliding travel of the sliding pins 67 along and within the leaf guide slots 68. This movement is mildly resisted by the compression of the springs 73. As a result of the swinging movement of the shutter leaves 56, the leaves move away from one another, and their separation distance increases until the sliding pins 67 reach the end of their travel in the guide slots 68 (at the radial outer ends of the slots). At this juncture the shutter assembly 25 is a fully open condition, and IR energy is admitted between the separated leaves 56 and through the limiting aperture 38. When the leaves are maximally separated, their lock pins 74 releasably engage (as by a snapping action), into the slots in corresponding spring lockers 72, to maintain the shutter assembly in the open condition. Also, a mounting tab 58 contacts the activator switch 76 to actuate the detector 21.

To close the shutter assembly, the forgoing process is simply reversed. The shutter ring 55 is manually rotated in the opposite (e.g., counterclockwise in FIG. 5) direction, to break contact between tab 58 and activator switch 76, and to disengage the lock pins 74 from their associated spring lockers 72. Continued counter-rotation of the shutter ring 55 until the sliding pins 67 obtain the opposite (inner) ends of the leaf guide slots 68 brings the leaves 56 back into contact with each other to place the shutter assembly in a closed condition.

According to a preferred embodiment, there also is provided means for increasing readings accuracy by accounting for the non-uniformity of energy radiance from a measured area 51 of a surface of interest, such as a temple or forehead, of a human patient 50. To overcome the disadvantages posed by non-uniform radiance, a means and method for scanning and integrating readings from across the measured area 51 is provided. This embodiment of the invention provides a method whereby the apparatus 10 is used to scan over the measured area 51, such as a patient's temple, and to integrate the reading during a predetermined period of time.

The scan-and-integrate mode of this alternative embodiment can be succinctly characterized as a method for measuring, at a measurement distance from a surface, the temperature of a measured area 51 of the surface of interest, in which the method includes the steps of (a) defining, with the main aperture 39 in the housing 30, a field of view; measuring with a detector the infrared energy entering the housing 30 via the main aperture; (b) limiting with the optical means including the limiting aperture 38 the infrared energy that strikes the detector 21; (c) displaying with an LCD display 29 viewable on the exterior of the housing 30 a visual readout of a measurement result; (d) preventing, with the limiting aperture, infrared energy not originating at the measured area 51 of the surface of interest from striking the detector 21; and (e) measuring energy emitted from the measured area 51 by scanning the measured area by moving the thermometer 10 relative to the surface; and integrating mathematically any non-uniform infrared energy measurements by the detector 21 from the measured area during a period of time; in which method the field of view is variable according to the measurement distance between the measured surface and the main aperture, while the measured area is substantially constant in size independent of the measurement distance.

This scan-and-integrate mode is performed by controllably moving the apparatus 10 in a limited translational or rotational "dithering" manner to correspondingly move the apparatus' field of view in a back-and-forth manner relative to the unmoving surface of interest. During such scanning, points on the surface of interest and within the measured area 51, and which for example were located generally in the center of the measured area, move to the edge, and vice versa. While points on the surface of interest seemingly move within the measured area, the system of the apparatus integrates the output of the respective points. This modality eliminates the requirement for a uniform radiance across the entire measured area 51, and promotes accurate use of the apparatus in a wider range of practical applications.

Figure 6:
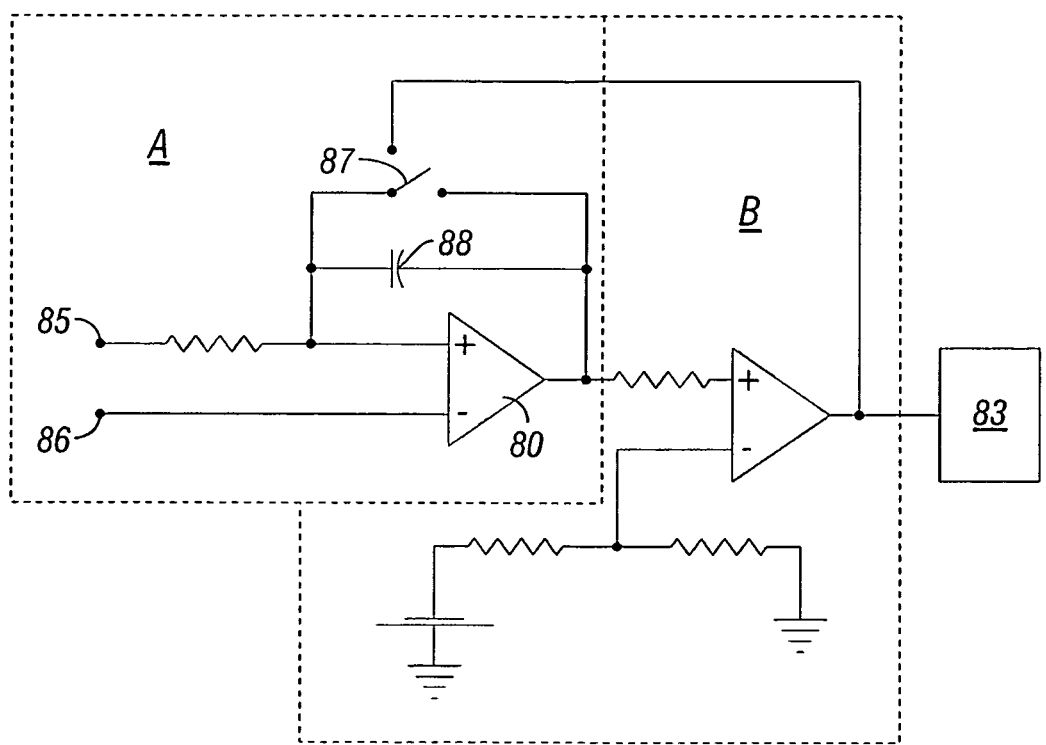
FIG. 6 is a schematic diagram of an electronic circuit usable in a preferred embodiment of the apparatus, for integrating the output of the energy detector of the apparatus to improve performance.

Reference is made to FIG. 6, which schematically describes a possible electronic circuit for integration of the detector output according to a preferred embodiment of the apparatus including the scan and integrate feature. In FIG. 6, Block A is an electronic integrator sub-circuit founded upon an operational amplifier 80. Points 85, 86 are in signal communication with the detector 21 output. Temperature readings taken by the detector 21 are transmitted to the integrator sub-circuit via the points 85 and 86.

Block B is a comparator sub-circuit. Known comparator circuits are used conventionally to compare two voltages. More specifically, comparator circuits known in the electronics arts may be used for detecting a certain voltage, and then switching a circuit according to the voltage that has been detected. When one voltage exceeds the other, the comparator circuit output is in one state, and when the input conditions are reversed, the comparator output switches to the other state. For example, a comparator circuit may have a reference voltage on one input, and a voltage that is being detected on another. While the detected voltage is above the reference voltage, the output of the comparator will be in one state. If the detected voltage falls below the reference, it will change the state of the comparator, and this may be used to "flag" the condition. In a preferred mode of operation herein, the operational amplifier goes into positive or negative saturation dependent upon the input voltages. As the gain of the operational amplifier is relatively high, the output runs into saturation when the inputs are only, for example, fractions of a millivolt apart.

Although operational amps are widely used in comparator circuits, special comparator chips alternatively are available. Such integrated circuits offer very fast switching times, well above those offered by most operational amps intended for more linear applications. Typical slew rates are in the region of several thousand volts per microsecond, although figures of "propagation delay" often are also quoted. Again, a typical comparator circuit such as B will have one of its inputs held at a given voltage. This may often be a potential divider from a supply or reference source. The other input is taken to the point to be sensed.

Thus, when the output of the comparator circuit B changes, the resulting pulse is counted by an associated microprocessor 83, and it also activates an analog switch 87 to discharge the capacitor 88 of the integrator sub-circuit A. Once the integrator capacitor 88 is discharged, the comparator circuit output changes back. This opens analog switch 87 and a new integration starts, and the process is repeated. The pulses from comparator B are counted by microprocessor 83 during a suitable pre-selected, predetermined, time period (which is the time of one scanned measurement). The total number of pulses thus generated is proportional to $$\int_{t_i}^{t_n} \Delta W\, dt$$

where $t_i$ is the start time and $t_n$ the end time of measurement. The $\Delta W$ is the difference between the power received and the power emitted by the detector 21 which, in a thermal infrared application, is proportional to $T_t - T_d$ where $T_t$ is the target temperature and $T_d$ is the temperature of the sensitive area of the detector 21. (Power, of course, is the time rate at which energy is transferred, and thus is derivative of work with respect to time.) The temperature readings taken by the detector and input to the integrating circuit may thus be integrated, over the predetermined period of time, to arrive at a composite temperature reading for the measured area despite any non-uniformity in emitted IR from the scanned measured area.

Figure 7A:
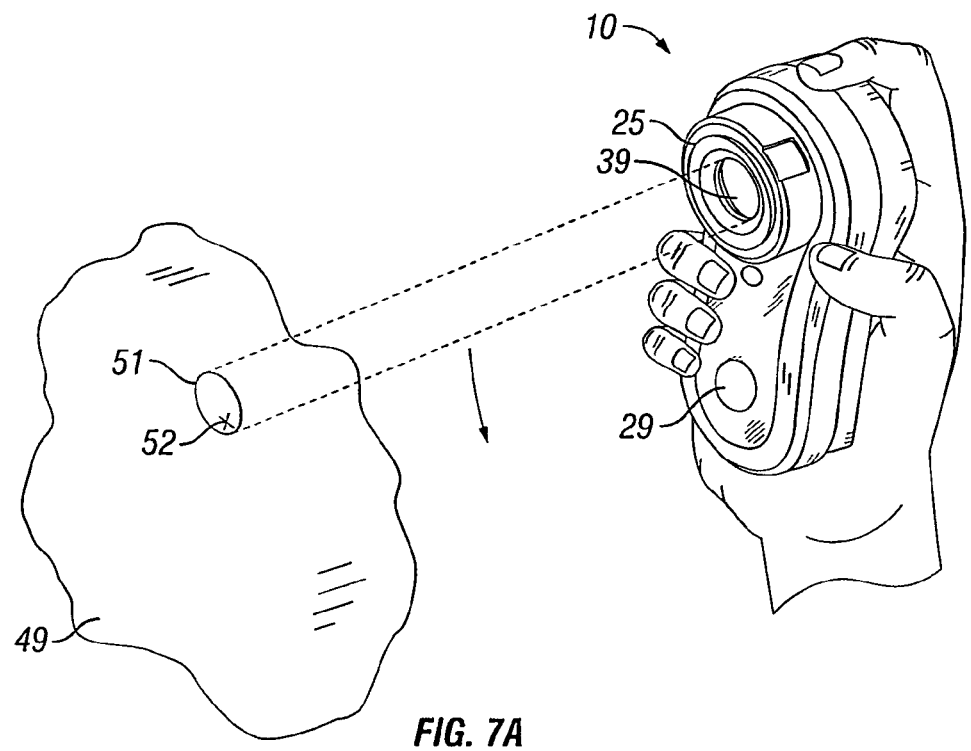
FIG. 7A is a view of the apparatus grasped in the hand of a user in a first position, relative to a surface of interest, for use in a scan-and-integrate mode for practicing the invention to promote accuracy in temperature measurement.
Figure 7B:
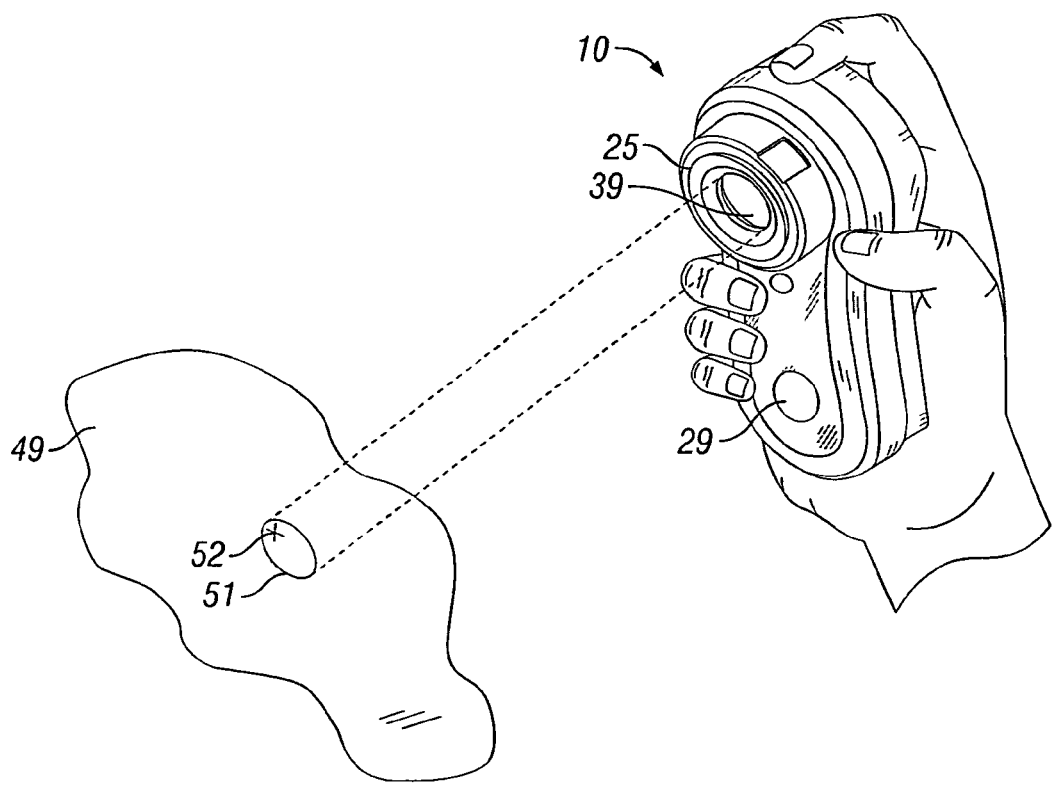
FIG. 7B is a view of the apparatus of FIG. 7A after the apparatus has been moved slightly to a second position, relative to the surface of interest, to shift the apparatus field of view and measured area relative to the surface of interest in a scan-and-integrate mode for practicing the invention.

FIGS. 7A and 7B offer assistance in understanding further this scan and integrate mode for practicing the invention. In such use, the front face of the thermometer apparatus 10 is aimed at the surface of interest 49, and the column of rays within the phantom lines of FIGS. 7A, 7B reach the measured area 51. To practice the invention, the apparatus is dithered or translated slightly back-and-forth, for example by the user's deliberate manual quivering. When the apparatus 10 is moved during this scanning, its field of view and the measured area 51 are moved with the apparatus relative to the surface of interest 49. Fixed points on the tangible surface of interest 49 that were located in the center of the measured area 51 at the beginning of the measurement change their location in relation to the apparatus field of view and the measured area. For example, in FIG. 7A there is seen any particular point X (labeled 52) fixed in position upon the actual surface of interest 49, and situated near the "bottom" of the measured area 51 defined from the apparatus 10. If the apparatus 10 is moved "down" as suggested by the large directional arrow in FIG. 7A, the apparatus field of view and thus the measured area 51 also shift correspondingly down. At the completion of the apparatus movement (e.g., dither or shifting translation), the particular point X (52) on the tangible surface of interest 49 is now situate at the apparent "top" of the measured area 51, as seen in FIG. 7B. Thus during the controlled movement of the apparatus 10 (or perhaps more precisely, the movement of the main aperture 39), particular points on the surface of interest 49 "move" relative to (generally within) the measured area 51, as the measured area tracks the movement of the apparatus 10 and thus moves about upon the surface of interest.

In a preferred mode of operation, therefore, the apparatus 10 is moved in a first direction so that the measured area 51 also moves relative to the surface of interest 49, such that a point X that is situated generally near the center of the measured at the beginning of the measurement scan shifts to a position just at or slightly outside the margin of the measured area. Movement of the apparatus is very briefly halted, and is then reversed, so that the point X "moves" back through the interior regions of the measured area 51 until it reaches a location at or near (either inside or preferably just outside) the opposite margin of the measured area. This process preferably is repeated one or more times, while optionally but preferably changing the angle between consecutive directions of movement of the measured area relative to the surface of interest 49. In this manner, any particular point X on the surface of interest effectively "moves" along at least one, preferably two or more, axes of the measured area 51, resulting in a beneficial scan of a portion of the surface of interest 49. In a thorough scan according to this method, a particular point on the surface of interest 49, although fixed upon the unmoving surface of interest, would seem to "bounce around" within the peripheral margin of the measured area 51 as a practiced user of the apparatus 10 repeatedly shifted or dithered the main aperture 39 in relation to the particular point.

A best practice of this scan-and-integrate embodiment of the invention is promoted by the use of the LED beams 46 and spots 47 to aim the apparatus 10 during its controlled dithering or back-and-forth movements. By observing the movements of the spots 47 upon the surface of interest, the user can regulate the scanning movement of the apparatus thereby to move the measured area 51 repeatedly back and forth across a comparatively restricted portion of the surface from which the temperature reading is to be taken. By way of example, a user may select a tiny visible point on the skin of a patient, and scan with the apparatus 10 the area immediately surrounding that point by shifting, twisting, dithering, etc. the apparatus for, say, approximately one-half to approximately five or six seconds, so as to randomly move the spots 47 proximately around and about the point. The measured area 51 accordingly moves over and about the point at which the apparatus is aimed, thereby taking a scanning reading of the area.

The scanned readings are then integrated for a composite measurement, calculated within the apparatus 10 according to the previous disclosure hereinabove, for visual display to the user.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. An apparatus adapted to be held in a user's hand for measuring, from a range of measurement distances from a surface, the temperature of a measured area of the surface, the apparatus comprising:
   a main housing having a main aperture partially defining an apparatus field of view;

a detector within the main housing for measuring infrared energy entering the housing via the main aperture, and having a sensitive area for detecting infrared energy entering the main housing;

means within the main housing for generating, outside the housing and at a distance from the main aperture, an optical image of the sensitive area having substantially the same shape as the sensitive area of the detector; and a limiting aperture defined within the main housing between the measured area and the generating means, and having approximately the same size and shape as the optical image, there being defined axially between the optical image and the limiting aperture an imaginary column having a lateral size corresponding generally to the size of the optical image; wherein infrared energy originating at the surface within the column passes through the limiting aperture to strike the sensitive area, and the limiting aperture prevents infrared energy not originating at the surface within the column from striking the sensitive area, wherein further a size of the measured area of the surface remains approximately constant notwithstanding changes in a distance between the measured area and the main aperture.

2. An apparatus according to claim 1 wherein the infrared energy detector comprises a thermopile detector.

3. An apparatus according to claim 1 further comprising means within the housing for directing to the infrared energy detector infrared light rays entering the housing via the main aperture.

4. An apparatus according to claim 3 wherein the means for directing infrared light rays comprises the means for generating an optical image.

5. An apparatus according to claim 1 wherein the means for generating comprises reflective optics.

6. An apparatus according to claim 5 wherein the reflective optics comprise a 45-degree off-axis parabolic mirror.

7. An apparatus according to claim 5 further comprising a one-piece housing, within the main housing, for holding the detector and the reflective optics.

8. The apparatus of claim 5 wherein the reflective optics also direct to the detector infrared light rays entering the housing via the main aperture.

9. An apparatus according to claim 1 further comprising a shutter assembly on the main housing, the shutter assembly movable between an open condition to admit infrared light rays through the main aperture, and a closed condition for preventing admission of dust through the main aperture.

10. An apparatus according to claim 9 further comprising a switch in communication with the shutter assembly, wherein the detector is actuated only when the shutter assembly is in the open condition.

11. An apparatus according to claim 9 wherein the shutter assembly comprises: a mounting bezel on the main housing; leaf guide slots defined in a face of the mounting bezel, each leaf guide slot spiraling mildly outward from a center of the face of the bezel; a shutter ring rotatably disposed on the mounting bezel; and at least two shutter leaves pivotally engaged with the shutter ring and slidably engaged with the leaf guide slots; wherein rotation of the shutter ring causes first ends of the shutter leaves to pivot in relation to the shutter ring, and second ends of the shutter leaves to slide in the leaf guide slots, thereby inducing a swinging movement in the leaves to move the leaves closer to or further from each other.

12. An apparatus according to claim 1 further comprising means on the main housing for aiming the main aperture toward the surface, the aiming means comprising at least two light-emitting diodes for creating beams of visible light, wherein spotlights are visible on the surface when the main aperture is aimed at the surface.

13. An apparatus according to claim 1, further comprising circuit means, in signal communication with the detector, for integrating mathematically any non-uniform infrared energy measurements by the detector from the measured area during a period of time, wherein energy emitted from the measured area is measured by scanning the measured area by moving the detector relative to the measured area.

14. The apparatus of claim 13 wherein the circuit means comprises:

an electronic integrator sub-circuit including an operational amplifier, which receives temperature readings data from the detector; and a comparator sub-circuit, responsive to voltage changes signaled by the integrator sub-circuit, for counting pulses wherein a total number of pulses is proportional to the integral, over the period of time, of a difference between power received and power emitted by the detector.

15. An apparatus adapted to be held in a user's hand for measuring, from a range of measurement distances from a surface, the temperature of a measured area of the surface, the apparatus comprising:

a main housing having a main aperture partially defining an apparatus field of view;

a detector within the main housing for measuring infrared energy entering the housing via the main aperture, and having a sensitive area for detecting infrared energy entering the main housing;

a single mirror within the main housing for generating, outside the housing and at a distance from the main aperture, an optical image of the sensitive area having a size and substantially the same shape as the sensitive area of the detector; and a limiting aperture defined within the main housing between the measured area and the generating means, there being defined axially between the optical image and the limiting aperture an imaginary column having a lateral size corresponding generally to the size of the optical image, the optical image having approximately the same size and shape as the limiting aperture;

wherein infrared energy originating at the surface within the column passes through the limiting aperture to strike the sensitive area, and the limiting aperture prevents infrared energy not originating at the surface within the column from striking the sensitive area, wherein further a size of the measured area of the surface remains approximately constant notwithstanding changes in a distance between the measured area and the main aperture.

16. An apparatus according to claim 15 further comprising means on the main housing for aiming the main aperture toward the surface, the aiming means comprising at least two light-emitting diodes for creating beams of visible light, wherein spotlights are visible on the surface when the main aperture is aimed at the surface.

17. An apparatus according to claim 15, further comprising circuit means, in signal communication with the detector, for integrating mathematically any non-uniform infrared energy measurements by the detector from the measured area during a period of time, wherein energy emitted from the measured area is measured by scanning the measured area by moving the detector relative to the measured area.

18. The apparatus of claim 17 wherein the circuit means comprises:

an electronic integrator sub-circuit including an operational amplifier, which receives temperature readings data from the detector; and a comparator sub-circuit, responsive to voltage changes signaled by the integrator sub-circuit, for counting pulses wherein a total number of pulses is proportional to the integral, over the period of time, of a difference between power received and power emitted by the detector.

\* \* \* \* \*